(12) United States Patent
Daigle et al.

(10) Patent No.: US 8,082,305 B2
(45) Date of Patent: Dec. 20, 2011

(54) SAVING UN-VIEWED INSTANT MESSAGES

(75) Inventors: Brian K. Daigle, Marietta, GA (US); Jerry Liu, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1140 days.

(21) Appl. No.: 11/304,320

(22) Filed: Dec. 15, 2005

(65) Prior Publication Data

US 2007/0143416 A1 Jun. 21, 2007

(51) Int. Cl.
*G06F 15/16* (2006.01)
(52) U.S. Cl. .......................... 709/206; 709/203
(58) Field of Classification Search .......... 709/201–207, 709/227–229, 238–244
See application file for complete search history.

(56) References Cited

U.S. PATENT DOCUMENTS

| 7,636,755 | B2 * | 12/2009 | Blattner et al. | 709/206 |
| 2001/0012286 | A1 * | 8/2001 | Huna et al. | 370/352 |
| 2004/0215721 | A1 * | 10/2004 | Szeto et al. | 709/204 |
| 2006/0173966 | A1 * | 8/2006 | Jennings et al. | 709/207 |
| 2006/0242246 | A1 * | 10/2006 | Lyle et al. | 709/206 |
| 2007/0143435 | A1 | 6/2007 | Daigle | |
| 2007/0168445 | A1 * | 7/2007 | Genty et al. | 709/207 |
| 2008/0126485 | A1 * | 5/2008 | Wang et al. | 709/204 |

OTHER PUBLICATIONS

Daigle; U.S. Appl. No. 11/609,615, filed Dec. 12, 2006.
Daigle; Non-Final Rejection mailed Apr. 17, 2009 for U.S. Appl. No. 11/609,615, filed Dec. 12, 2006.

* cited by examiner

*Primary Examiner* — Ian N Moore
*Assistant Examiner* — Afshawn Towfighi
(74) *Attorney, Agent, or Firm* — Thomas, Kayden, Horstemeyer & Risley, LLP

(57) ABSTRACT

Included is a method for saving instant messages. Embodiments of the method include receiving a message from a sender, wherein the message is configured for delivery to a recipient. Embodiments of the method also include determining whether the recipient has viewed the message, and in response to determining that the recipient has not viewed the message, storing the message for subsequent delivery.

16 Claims, 11 Drawing Sheets

SAVING UN-VIEWED INSTANT MESSAGES

BACKGROUND

With the advent of the Internet, different forms of digital communications have recently appeared. Examples of such digital communications include email and instant messaging (IM). Often, in instant messaging, one user communicates with another user in near real time. Unlike email messages, which reside on a server or a client until deleted, IM messages typically vanish when an IM chat session is terminated, unless that instant messaging chat session is recorded in an instant messaging chat transcript.

Currently, techniques exist in which instant messaging (IM) chat sessions are recorded in an instant messaging chat transcript. Often, these techniques provide mechanisms for either activating or deactivating the chat transcript. When the option to record the chat transcript is activated, every instant messaging chat session is recorded. Conversely, when the option to record the chat transcript is deactivated, then none of the instant messaging chat sessions are recorded.

Additionally, current instant messaging systems include a save function that activates when the desired recipient of an instant message is not logged onto an instant messaging server. If a sender sends an instant message to a recipient who is not currently logged onto the instant messaging server, the recipient will not receive the message. Upon determination that the recipient is not available, the instant messaging server can save the message for delivery when the recipient logs onto the instant messaging server at a later time.

While these techniques address various issues in instant messaging, often a user may be engaged in an instant messaging chat session or otherwise logged onto the instant messaging server. In such a scenario, the user's client device may receive an instant message that the user never views. Before the user has a chance to view the message (or even know that the message has arrived), the user's client device may reboot, restart, shutdown, or otherwise close the user's instant messaging software (or any permutation). In such a scenario, the sender and the instant messaging server will both believe that the message was delivered and incorrectly assume that the recipient has viewed the message.

Thus, a heretofore unaddressed need exists in the industry to address the aforementioned deficiencies and inadequacies.

SUMMARY

Embodiments of the present disclosure include methods for saving instant messages. At least one embodiment of a method includes receiving a message from a sender, wherein the message is configured for delivery to a recipient; sending the received message to a first client device related to the recipient; determining whether the recipient has viewed the message; and in response to determining that the recipient has not viewed the message, storing the message for subsequent delivery.

Additionally, the present disclosure also discusses computer readable mediums for saving instant messages. At least one embodiment of a computer readable medium includes logic configured to receive a message from a sender, wherein the message is configured for delivery to a recipient and logic configured to send the received message to a first client device related to the recipient. Additionally, embodiments of the computer readable medium include logic configured to determine whether the recipient has viewed the message, and logic configured to, in response to determining that the recipient has not viewed the message, store the message for subsequent delivery.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

DETAILED DESCRIPTION

Figure 1:
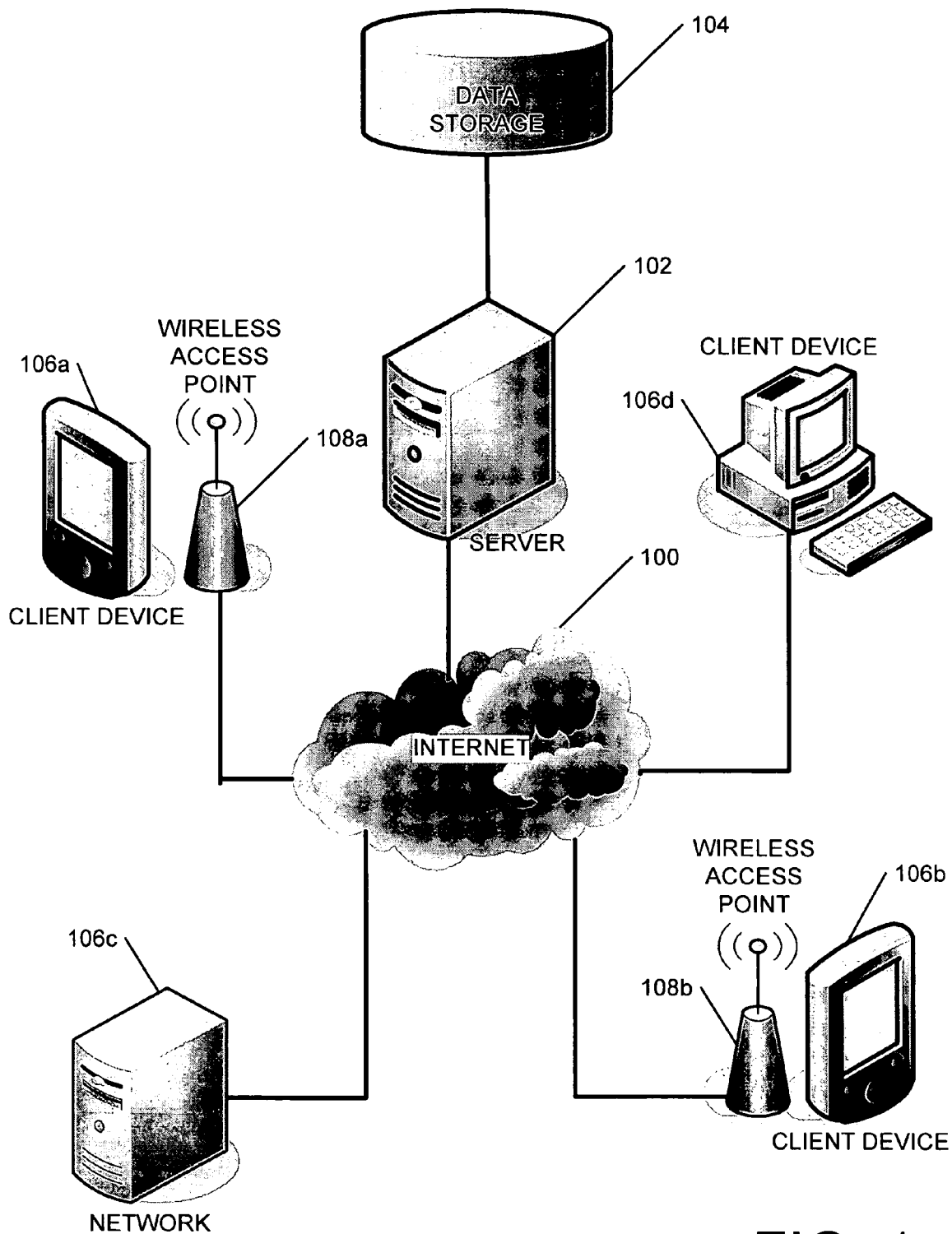
FIG. 1 is a functional diagram of an exemplary instant messaging network environment.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a functional diagram of an exemplary instant messaging network environment. As illustrated, a plurality of users may be connected via an external network such as the Internet 100 or other network. The users may access the Internet 100 via client devices 106a (via wireless access point 108a), 106b (via wireless access point 108b), 106c, and 106d.

The client devices may include, for example, portable communication devices 106a and 106b, a local network 106c and/or a personal computer 106d. It should be appreciated that the external network, client devices and connections illustrated in FIG. 1 are shown by way of example, but this disclosure is not limited to these examples. The disclosure may be applicable to any client device, connection, and external network that supports instant messaging. Additionally included in this nonlimiting example is a server 102 that is coupled to a data storage unit 104.

During an instant messaging session, a user may activate instant messaging client software that is stored on the user's client device 106a. Activation of the instant messaging client software can facilitate a connection request with the server 102, which may be a dedicated instant messaging server. The server 102 can then authenticate the user via various authentication techniques including, but not limited to technologies related to a user identification (userid) and password (userpw) and various biometric authentication processes. Generally speaking, the authentication process includes the server receiving the requested data (such as a userid and userpw) and comparing that data with data stored on the data storage device (or data storage logic) 104. If the data submitted by the user matches the data stored in data storage 104, the user can be authenticated.

Once the user has been authenticated, the user can send an instant message to any of his or her contacts (e.g., other users of the instant messaging network). Generally speaking, the user can send an instant message to anyone who has an account with the server 102. If the user knows the desired recipient's account name, handle, or instant message identification (IMID) associated with the server 102, the user can send an instant message to that recipient. In many circumstances, the user will have the user's contacts saved on the instant messaging client software or on the server 102 such that the user does not have to re-enter the account name each time the user wishes to send an instant message.

Additionally, the server 102 can keep track of the various users that are currently logged onto the server, and provide presence information regarding the user's contacts. Thus, if a user wishes to send an instant message to a recipient contact, the server 102 can send information as to whether that contact is currently logged onto the server. Upon receiving the presence data related to the user's contacts, the user can then send an instant message to a recipient contact (whose presence is determined), thereby beginning an instant messaging chat session.

In at least one instant messaging environment, each message sent between the user and the contact can be communicated through the server 102. In such a scenario, the user at client device 106a can compose and send an instant message that is directed from the user's client device 106a to the wireless access point 108a, and then to the Internet 100. The message can then be sent to the server 102 back through the Internet 100 to the recipient's client device 106b.

While one or more instant messaging environments may work this way, others may work without the messages being communicated through the server 102. Additionally, some instant messaging environments may have a dedicated instant messaging server (or servers) while others may use devices of varying capabilities to also manage instant messaging traffic. Further, while this nonlimiting example discusses a proprietary instant messaging environment, this disclosure also contemplates an environment utilizing a universal instant messaging protocol, or a communications environment that facilitates communication across a plurality of different instant messaging services using a plurality of different instant messaging protocols.

Figure 2:
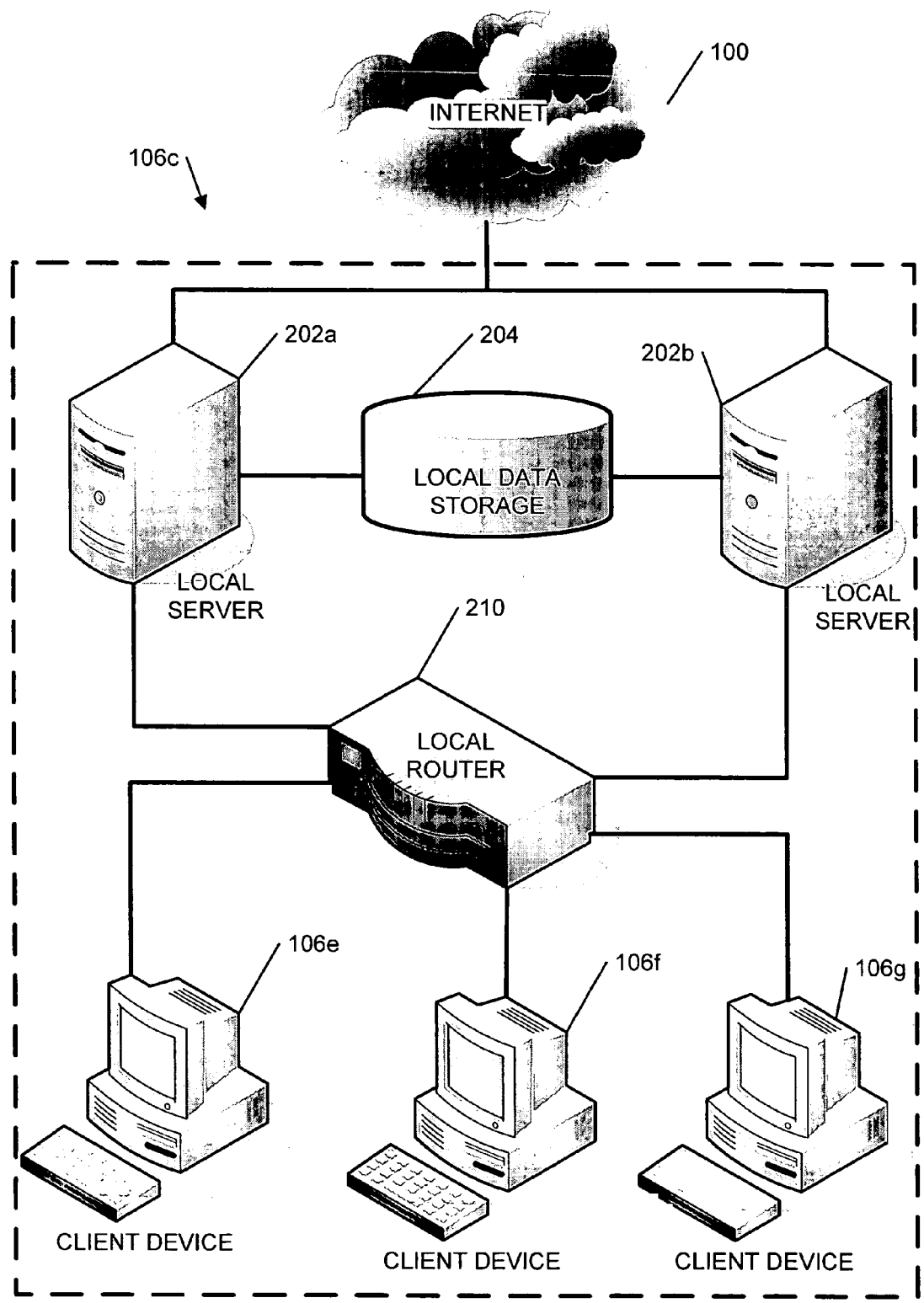
FIG. 2 is a functional diagram of an exemplary local network environment by which a user can send an instant message, similar to the environment from FIG. 1.

FIG. 2 is a functional diagram of an exemplary local network environment by which a user can send an instant message, similar to the environment from FIG. 1. The local network environment of FIG. 2 can be a home network, a business network or other network configured to facilitate communication between users. As illustrated, client devices 106e, 106f, 106g are coupled to a local router 210. This coupling may be wire-line or wireless. Though depicted as personal computers, the client devices 106e, 106f, and 106g may be implemented with any device capable of supporting instant messaging in a local network. The local router is coupled to local server 202a and local server 202b. The local servers 202a, 202b (collectively referred to as local server 202) are coupled to local data storage 204. The local servers 202 are also coupled to an external network, such as the Internet 100.

In this exemplary networking environment a user located at client device 106e may desire to send an instant message to a recipient located at client device 106g. In the networking environment of FIG. 2, the user at client device 106e can compose and send the instant message via client software stored on the client device 106e. The message can then be sent from the client device 106e to the local router 210. The local router can then send the message to one of the local servers 202. The local server 202 can then communicate the message back through the local router 210 to the intended recipient located at client device 106g.

As the nonlimiting example of FIG. 2 illustrates, instant messages can be sent internal to the local network, without the user of an external network, such as the Internet 100. As stated above, such a configuration may be desirable for a business that wishes to facilitate communication between employees, but not to the Internet community at large. Such a configuration may use its own instant messaging protocol, a universal instant messaging protocol, or a known proprietary instant messaging protocol.

Additionally, while the configuration of FIG. 2 facilitates intra-network instant messaging, such a configuration could also facilitate inter-network instant messaging, similar to the configuration from FIG. 1. In such a scenario, a user operating client device 106f can send and receive messages to a contact that is not located within the local network of FIG. 2 via client device 106f. The message can be sent through local router 210 to local server 202. From local server 202, the message can be sent to an external network, such as the Internet 100.

Referring back to FIG. 1, the message can then be sent from the network 106c to server 102 (which is not part of the local network in FIG. 2), and then back through the Internet 100 to client device 106b. The contact that is operating client device 106b can then reply through the same channels. More specifically, the reply message can be sent from 106b through the Internet 100 to the server 102, back through the Internet 100, to the network 106c (to FIG. 2), to the local server 202, through the local router 210, and back to the user at client device 106f.

One should note that the configuration of FIG. 2 is a nonlimiting example. Components can be added or removed (or both) without diverging from the scope of this disclosure. Additionally, although the configurations from FIGS. 1 and 2 are illustrated as various examples of instant messaging configuration, these are also not meant to be limiting. More specifically, in at least one configuration, instant messages sent between unrelated users need not use the Internet 100. Two users that are engaged in an instant messaging chat session on the same Internet Service Provider (ISP) may not require the use of the Internet 100 to facilitate the communication. As the ISP can link a user to the Internet 100, two users operating on the same ISP may simply use the ISP to facilitate the communication. In such a scenario, the configuration of FIG. 2 becomes more applicable, even for users who are not otherwise related. Additionally, if a company has multiple offices, use of the Internet 100 for instant messaging communications may be desired.

Figure 3:
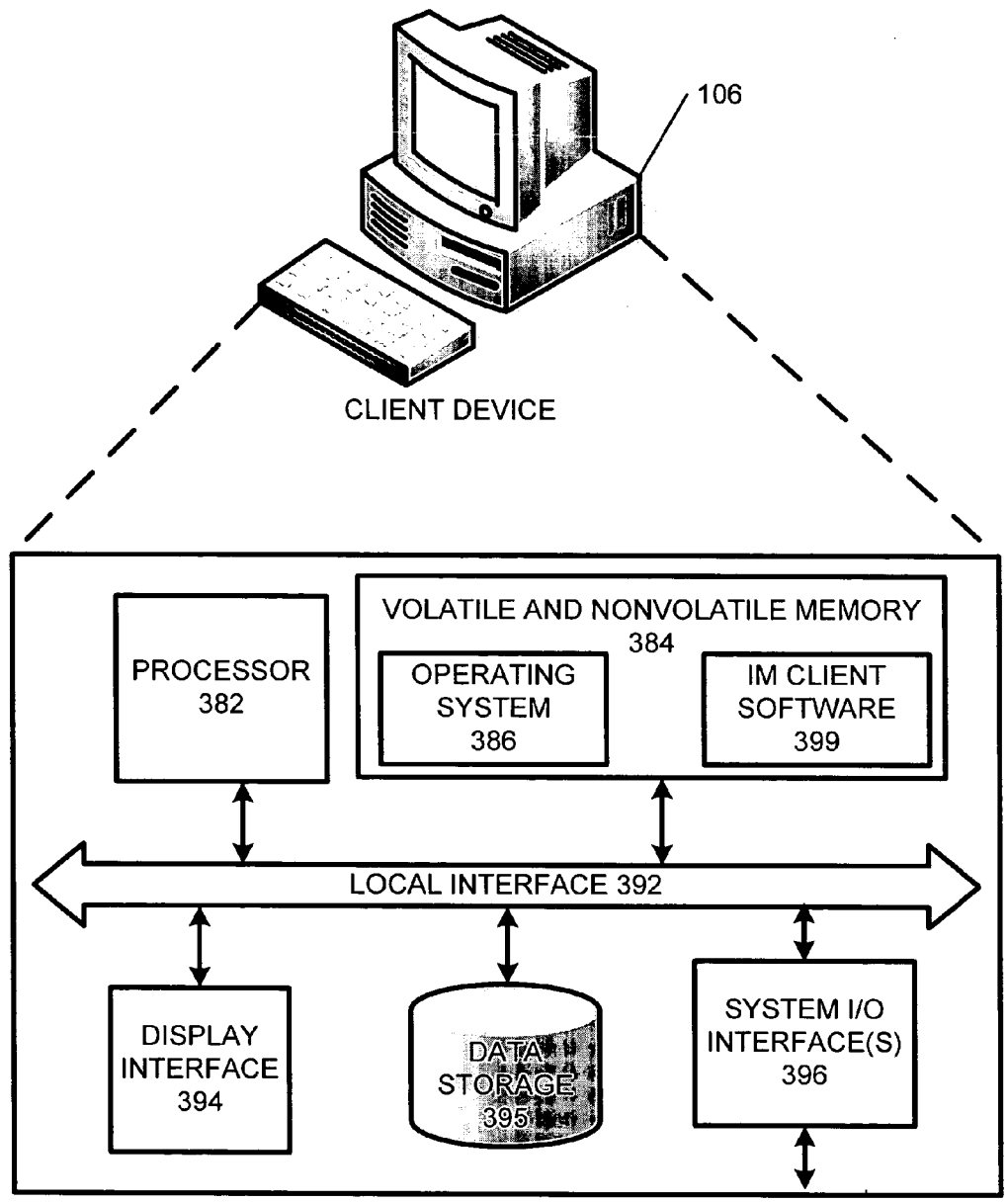
FIG. 3 is a functional diagram illustrating an exemplary embodiment of a client device that may be configured to communicate via a communications network such as the networks from FIGS. 1 and 2.

FIG. 3 is a functional diagram illustrating an exemplary embodiment of a client device that may be configured to communicate via a communications network such as the networks from FIGS. 1 and 2. Although a wire-line client device is illustrated, this discussion can be applied to any device. Generally, in terms of hardware architecture, as shown in FIG. 3, the client device 106 includes a processor 382, volatile and nonvolatile memory 384, a display interface 394, data storage 395, and one or more input and/or output (I/O) device interface(s) 396 that are communicatively coupled via a local interface 392. The local interface 392 may include, for example, one or more buses or other wired or wireless connections. The local interface 392 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 382 may be a hardware device for executing software, particularly software stored in volatile and nonvolatile memory 384.

The processor 382 can be any custom made or commercially available processor, a central processing unit (CPU), an auxiliary processor among several processors associated with the client device 106, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80×86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The volatile and nonvolatile memory 384 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 1314 may incorporate electronic, magnetic, optical, and/or other types of storage media. Note that the volatile and nonvolatile memory 384 can have a distributed architecture, where various components are situated remote from one another, but can be accessed by the processor 382. Additionally volatile and nonvolatile memory 384 can also include an operating system 386.

The software in volatile and nonvolatile memory 384 may include one or more separate programs, each of which includes an ordered listing of executable instructions for implementing logical functions. In the example of FIG. 3, the software in the volatile and nonvolatile memory 384 may include instant messaging client software 399, as well as operating system 386. A nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in hand-held computers or personal data assistants (PDAs) (e.g., PalmOS® available from Palm® Computing, Inc., and Windows CE® available from Microsoft® Corporation). The operating system essentially controls the execution of other computer programs and provides scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 384, so as to operate properly in connection with the Operating System.

The Input/Output devices that may be coupled to system I/O Interface(s) 396 may include input devices, for example but not limited to, a keyboard, mouse, scanner, microphone, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If the client device 106 is a personal computer, workstation, or the like, the software in the volatile and nonvolatile memory 384 may further include a basic input output system (BIOS) (omitted for simplicity). The BIOS is a set of software routines that initialize and test hardware at startup, start the Operating System, and support the transfer of data among the hardware devices. The BIOS is stored in ROM so that the BIOS can be executed when the client device 106 is activated.

When the client device 106 is in operation, the processor 382 is configured to execute software stored within the volatile and nonvolatile memory 384, to communicate data to and from the volatile and nonvolatile memory 384, and to generally control operations of the client device 106 pursuant to the software. Software in memory, in whole or in part, are read by the processor 382, perhaps buffered within the processor 382, and then executed.

Figure 4:
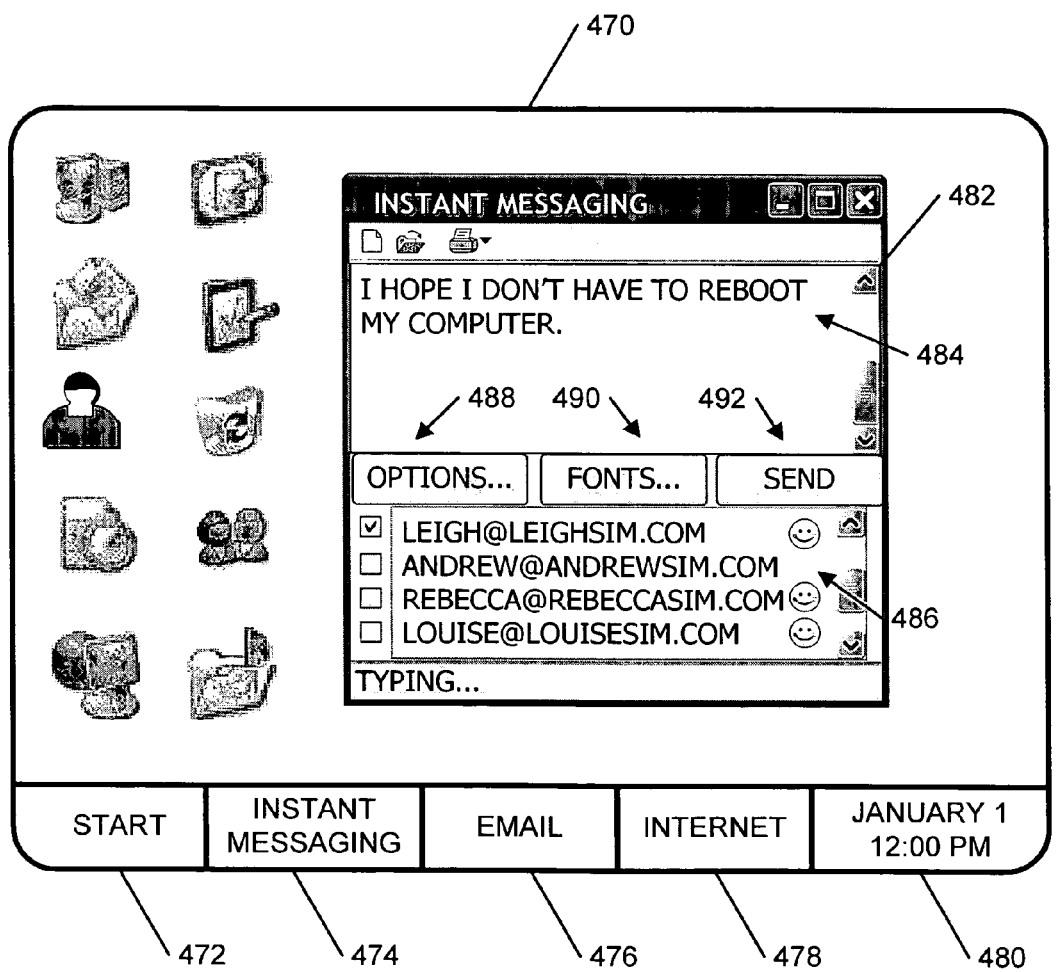
FIG. 4 is an illustration of an exemplary display for the instant messaging client software discussed with reference to FIGS. 1 and 2.

FIG. 4 is an illustration of an exemplary display for the instant messaging client software discussed with reference to FIGS. 1 and 2. As illustrated, the desktop display 470 can include a "START" button 472, an "INSTANT MESSAGING" taskbar menu item 474, and "EMAIL" taskbar menu item 476, an "INTERNET" taskbar menu item 478, and a Date and Time indicator 480. As one of ordinary skill in the art will understand the taskbar menu items can be linked to various software programs that are currently open on the client device 106. As a nonlimiting example, the instant messaging client software 399, which can be configured to display a user interface, similar to instant messaging window 482, relates to the taskbar menu item 474. By selecting the "INSTANT MESSAGING" taskbar menu item 474, the user can display and remove the instant messaging window 482 from the desktop display 470.

As illustrated, the instant messaging window 482 includes an input box 484 for the user to enter a message for a contact.

The input box 484 can be configured to display both outgoing messages and incoming messages. As such, a history (thread) of the current instant messaging session can be documented. The contact can be selected by the checkbox, next to each contact in the contact section 486 of the instant messaging window 482. Additionally in contact section 486 is a presence icon associated with each contact. As discussed above, the server 102 (or 202, depending on the configuration) can determine which users are currently logged onto the server and can display this information to contacts of that user. In this nonlimiting example, the contacts "Leigh," "Rebecca," and "Louise" are currently logged onto the server, while "Andrew" is not logged onto the server.

Additionally included in the instant messaging window 482 are an "OPTIONS . . . " button 488, a "FONTS . . . " option 490, and a "SEND" option. The "OPTIONS . . . " option 488 can provide the user access to various options related to the display of the instant messaging Window 482, sending options, receiving options, presence options, etc. The "FONTS . . . " option 490, on the other hand can provide the user with various options to determine the display fonts for messages, both sent and received. The "SEND" option 492 is an action button that executes sending of a message to the recipient or recipients, in response to selection by a user.

One should note that the instant messaging client software 399, which can be configured to display the user interface of FIG. 4, is included for purposes of illustration, not limitation. As is evident to one of ordinary skill in the art, any instant messaging logic can be used to facilitate communication of instant messages from a user to a contact.

Figure 5:
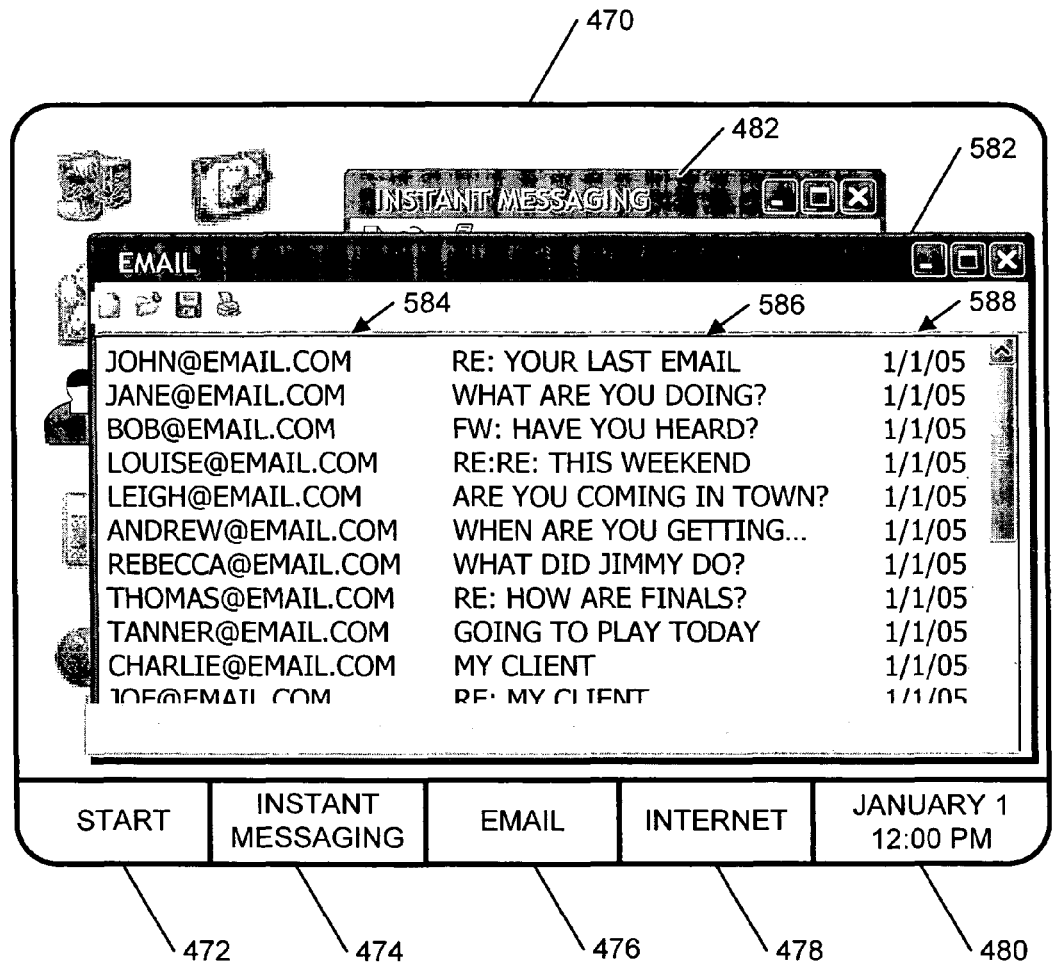
FIG. 5 is an illustration of an exemplary display for the instant messaging client software that has been deselected by the user activating another program, as in an instant messaging environment such as discussed with reference to FIGS. 1 and 2.

FIG. 5 is an illustration of an exemplary display for the instant messaging client software that has been deselected by the user activating another program (e.g., window focus is switched to another window), as in an instant messaging environment such as discussed with reference to FIGS. 1 and 2. As illustrated, the desktop display 470 includes the "START" button 472 and Date and Time indicator 480. Also included are the "INSTANT MESSAGING," "EMAIL," and "INTERNET" menu taskbar items 474, 476, and 478, respectively. As discussed with reference to FIG. 4, the "INSTANT MESSAGING" taskbar menu item 474 is associated with the instant messaging window 482. Similarly, the "EMAIL" taskbar menu item 476 is associated with the Email window 582. The Email window 582 includes a list of received emails from users, as shown in column 584. A description of the received email is denoted in column 586 and the date the email was received is denoted in column 588.

As shown in FIG. 5, the Email window 582 has covered up the instant messaging window 482. As such, when the user's client device 106 receives an instant message from a sender, the user may not be aware of the arrival of the instant message. Additionally, as many operating systems 386 provide an indicator that a change in a de-selected window has occurred (such as receiving an instant message when the instant messaging window is de-selected), the user may be aware of the message, but for whatever reason has not viewed the received message. As a nonlimiting example, the user may be busy on another program, or may not be proximate the client device 106 when the message is received. Regardless of the reason, the user's client device 106 receiving a message does not necessarily indicate that the user has viewed the message.

Figure 6:
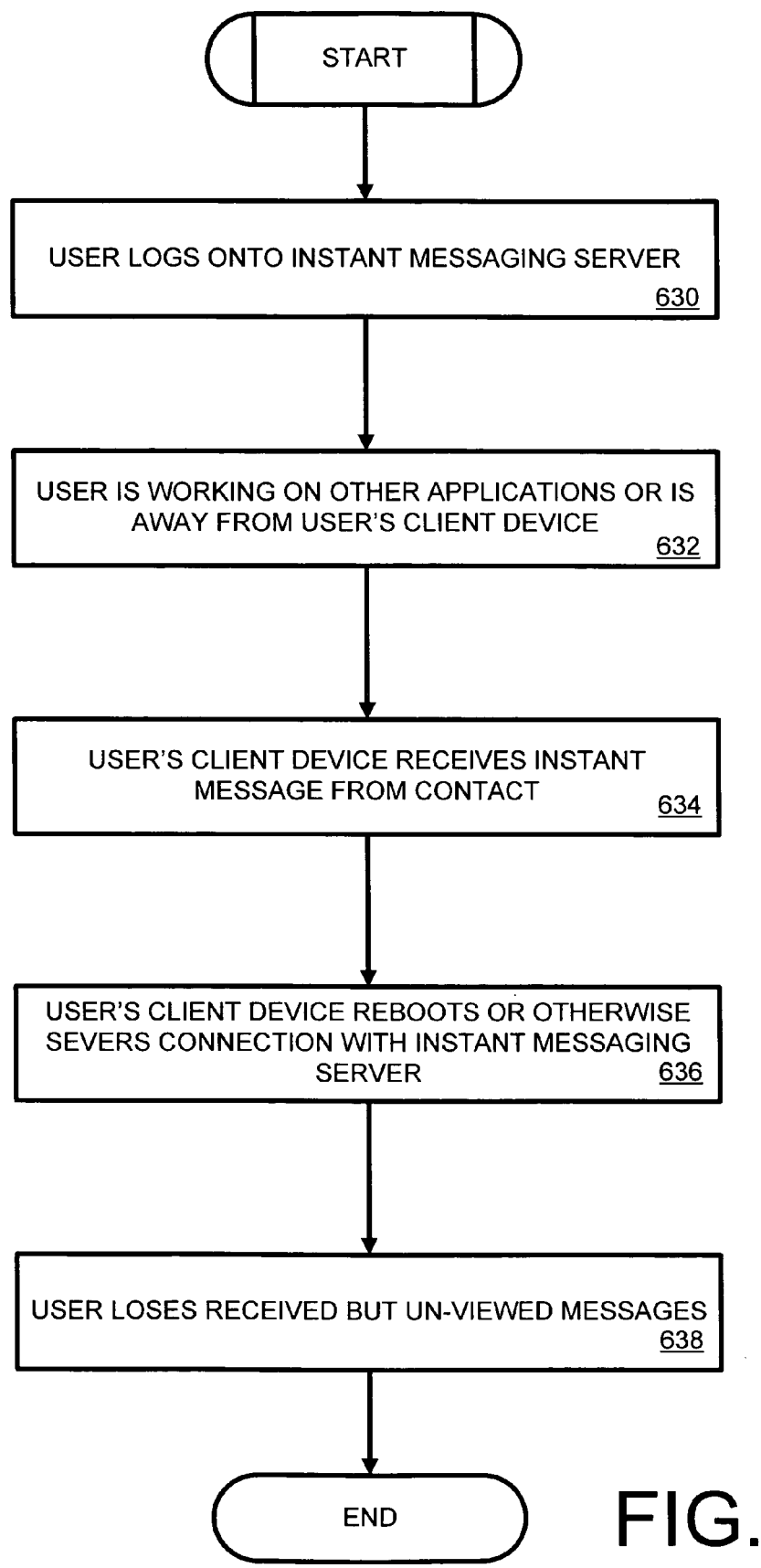
FIG. 6 is a flowchart illustrating exemplary steps that may be taken in the instant messaging environment from FIGS. 1 and 2.

FIG. 6 is a flowchart illustrating exemplary steps that are currently taken in the instant messaging environment from FIGS. 1 and 2. The first step in this nonlimiting example is for the user to log onto a server that supports instant messaging (block 630). The user can log onto a dedicated instant messaging server 102, or a general network server that provides instant messaging services. As discussed with reference to FIGS. 1 and 2 the user can be authenticated before gaining access to the server 102. Next, while the user is logged onto the instant messaging server 102, the user can be working on other applications or can be away from the client device 106 (block 632). One should note that while the flowchart of FIG. 7 indicates that the user is performing either of these two options, one of ordinary skill in the art would understand that these are nonlimiting examples illustrating that the user's client device 106 may receive a message, but the user may not have viewed the message.

The next step in the flowchart of FIG. 6 is that the user's client device 106 receives an instant message from a sender (block 634). Then, the user's client device 106 reboots or otherwise disconnects the established connection with the instant messaging server 102 and/or closes the instant messaging software 399 (block 636). As stated above, the user may lose important messages that were received but not view before severance of the connection with the instant messaging server. As a nonlimiting example, a user may access instant messaging software 399 at work, which can log the user onto an instant messaging server 102. At the end of the day, the user leaves work but the client device 106 may remain running with the instant messaging software 399 open and coupled to instant messaging server 102. If the user's client device 106 receives a message after the user has left work, the user may be unaware of the received message. Additionally, if the network environment performs a network reboot (or the client device 106 otherwise closes instant messaging software 399), the user's client device 106 may lose the received message without the user even being aware that a message was received (block 638).

Figure 7:
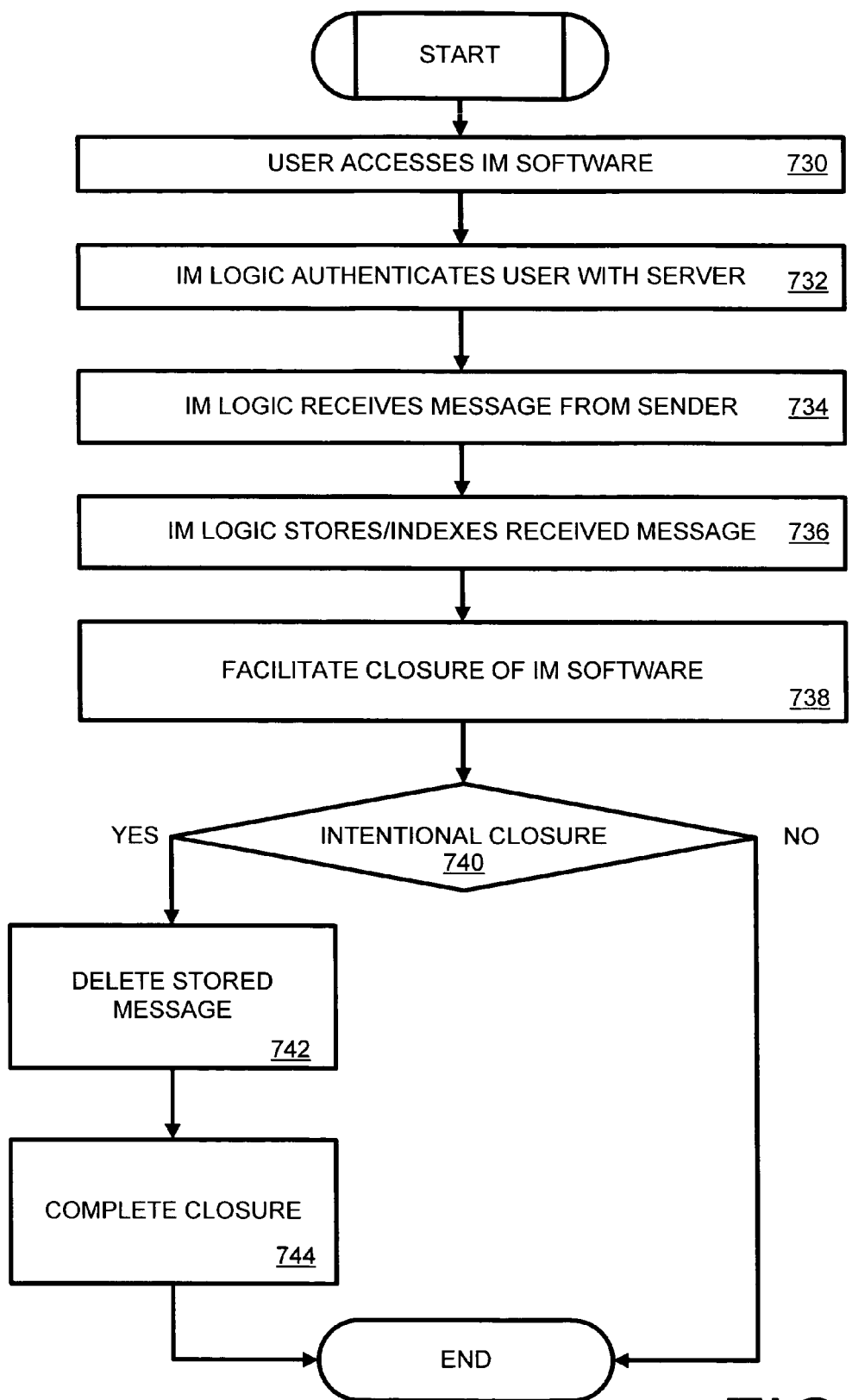
FIG. 7 is a flowchart of exemplary steps for determining if a system change is intentional in an instant messaging environment such as the environments from FIGS. 1 and 2.

FIG. 7 is a flowchart of exemplary steps for determining if a system change is intentional in an instant messaging environment such as the environments from FIGS. 1 and 2. As illustrated in this nonlimiting example, the first step of the flowchart in FIG. 7 is for the user to access the instant messaging software 399 (block 730). When a user desires to send and receive instant messages, the user can access instant messaging software 399 that can be stored on the user's client device 106. After the user has logged onto the instant messaging software 399, the instant messaging software 399 can authenticate the user with a server that is associated with instant messaging services (block 732). Once the user is authenticated with the instant messaging server (such as instant messaging server 102), the instant messaging software 399 can receive a message from a sender (block 734). The instant messaging software 399 can then facilitate storage and indexing of the received message (block 736), such as in storage device 395 or other storage logic. After receiving and storing the message, the user's client device 106 can close the instant messaging software 399 (block 738). A determination can then be made as to whether closing the instant messaging software 399 is intentional (block 746). If closing the instant messaging software was intentional (i.e., the user manually closed the instant messaging software 399, the user manually restarted the client device 106, etc.) the instant messaging software 399 can delete the stored message (block 742), and complete the closure (block 744). If, on the other hand, the closure is unintentional (i.e., computer crash, network reboot, etc.), the process can end with the received message being available in storage.

One should note that while the decision step (block 740) indicates that an active decision is made, this is not a requirement. As one of ordinary skill in the art will understand, in some embodiments, this step may simply be a description of the resulting action. More specifically, if the user intentionally closes the instant messaging software 399, the instant messaging software 399 can have the opportunity to delete any saved message. Similarly, if closure of the instant messaging software 399 is unintentional, the closure may be unexpected and the instant messaging software 399 may not have the opportunity to delete stored messages. In such a scenario, the saved message will not be deleted, and may be displayed upon reactivation of the instant messaging software 399.

Figure 8:
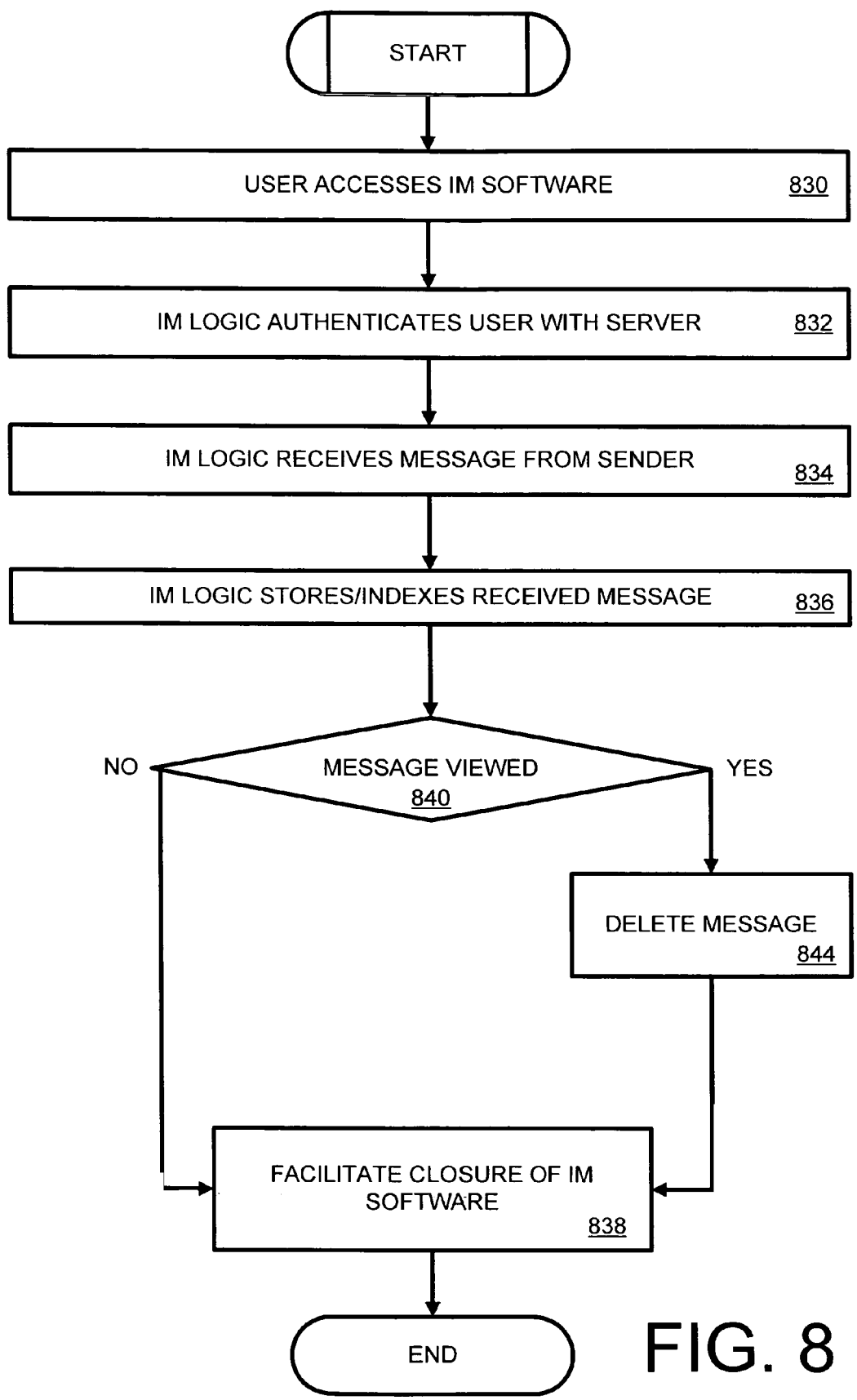
FIG. 8 is a flowchart of exemplary steps for determining if a received instant message has been viewed in an instant messaging environment such as the environments from FIGS. 1 and 2.

FIG. 8 is a flowchart of exemplary steps for determining if a received instant message has been viewed in an instant messaging environment such as the environments from FIGS. 1 and 2. As illustrated, the first step of FIG. 8 is for the user to access the instant messaging software 399 (block 830). As stated above, the user can access the instant messaging software 399 by selection of an icon associated with the instant messaging software 399. Additionally, the instant messaging software 399 can be accessed upon startup of the client device 106. Other access techniques are also contemplated. Once the instant messaging software 399 is accessed, the instant messaging software 399 can authenticate the user with the instant messaging server 106 (block 832). As described above, authentication with the instant messaging server can occur in a number of ways including use of a userid and userpw and biometric authentication techniques.

The next step in the flowchart of FIG. 8 is for the instant messaging software 399 to receive an incoming message from a sender (block 834). The instant messaging software 399 can then store and index the received message (block 836). The instant messaging software 399 can then directly determine whether the message has been viewed (block 840). Direct determination of whether a received message is viewed can include: determining whether the instant messaging display 482 is active from the time the message was received; determining whether the received message is located in the viewable portion of the instant messaging display 482; determining whether the user has selected an option indicating that the message is viewed, etc.

If the instant messaging software 399 directly determines that the message has been viewed, the instant messaging software 399 can delete the received message from storage (block 844). The flowchart can then proceed to closure of the instant messaging software 399. If, on the other hand, the instant messaging software 399 directly determines that the user has not viewed the message, no action is taken prior to closing the instant messaging software 399.

Figure 9:
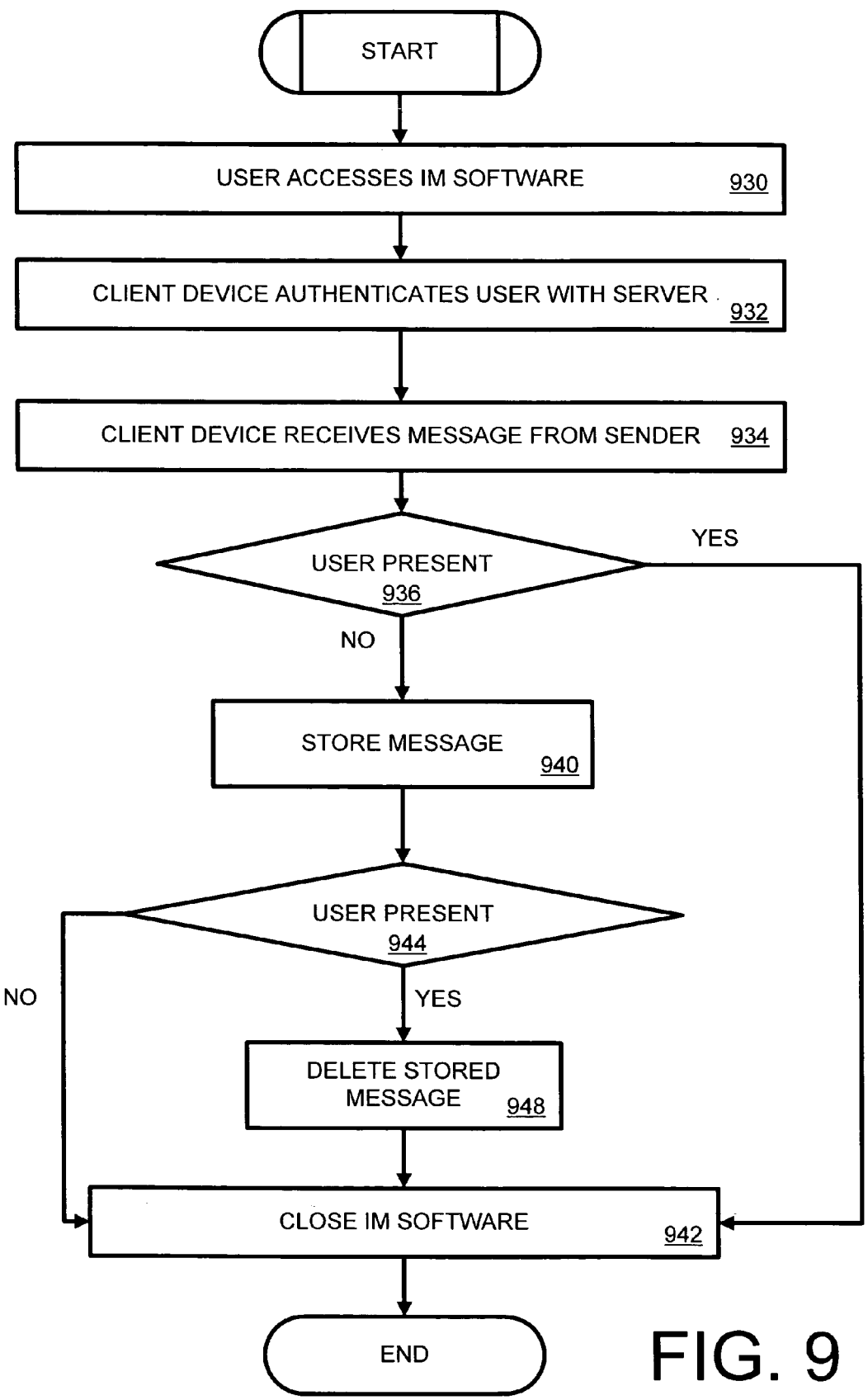
FIG. 9 is a flowchart of exemplary steps that may be taken to determine if a user is present on a client device when an instant message is received, as in the environments of FIGS. 1 and 2.

FIG. 9 is a flowchart of exemplary steps that may be taken to determine if a user is present on a client device when an instant message is received, as in the environments of FIGS. 1 and 2. As illustrated, the first step in the flowchart of FIG. 9 is to access the instant messaging software 399 (block 930). As stated above, this process can include the user actively selecting an icon (or other identifier) associated with the instant messaging software 399 or other actions, such as starting up the user device 106. Next, the instant messaging software 399 can authenticate the user with the instant messaging server 102 (block 932). Next, the instant messaging software 399 can receive an incoming message from a sender (block 934). The instant messaging software 399 can then determine whether the user is present at the user's client device 106 (block 936). Presence information can be determined in a general manner (i.e., determining whether the user is currently logged onto a network server, determining whether the client device 106 has received a user input, etc.), however this is not a requirement. Presence data can also be determined by the instant messaging software 399 determining whether the user is physically present at the client device (e.g., via use of a camera or other proximity sensors). Additionally, presence data can be determined via historical instant message usage logs, as described in "Using Statistical Tracking Information of Instant Messaging Users," filed on Dec. 15, 2005, having application Ser. No. 11/304,287, which is hereby incorporated herein by reference.

If the user is present at the client device 106, the instant messaging software 399 may be closed (block 942). If however, the instant messaging software 399 determines that the user is currently not present at the client device 106, the instant messaging software 399 can store the received message (block 940). The instant messaging software 399 can then continuously or periodically check the user's presence status to determine if the user has returned to the client device 106 (block 944). If the user has returned to the client device 106, the instant messaging software 399 can delete the message from storage (block 948) and the instant messaging software 399 can be closed (block 942). If, however, the continuous or periodic determination of the user's presence indicates that the user has not returned to the client device 106, no action need be taken prior to closing the instant messaging software 399.

Figure 10:
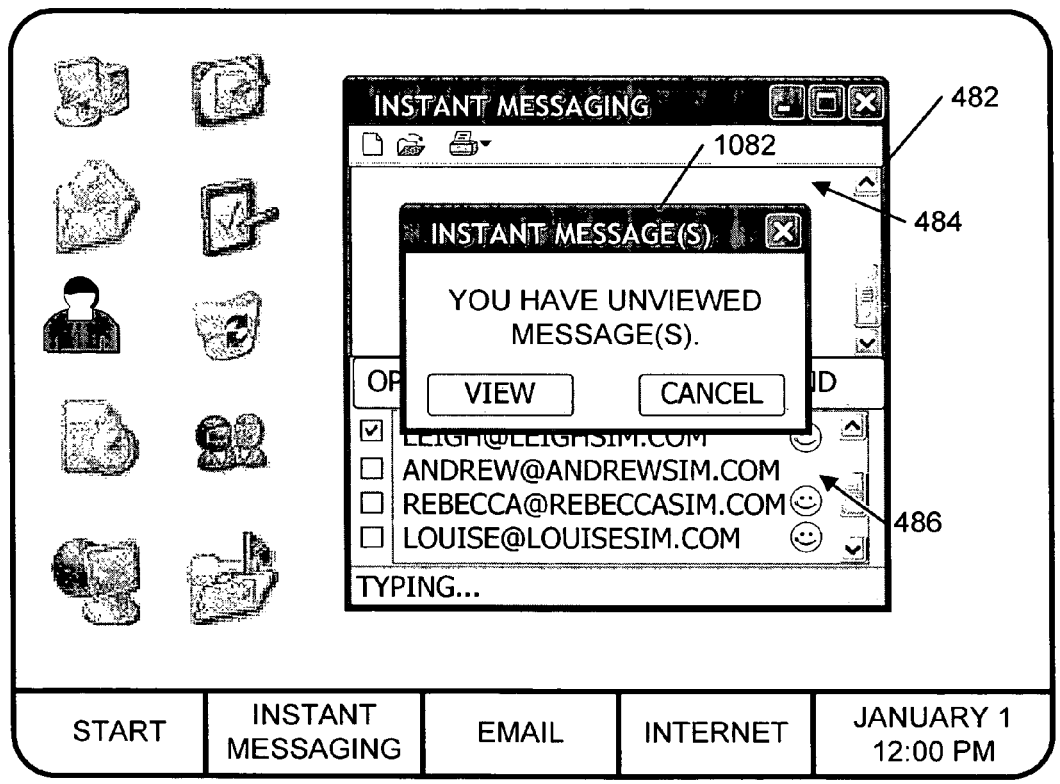
FIG. 10 is a display of an exemplary instant messaging interface, illustrating display for informing a user that unviewed messages are available, similar to the interface from FIG. 4.

FIG. 10 is a display of an exemplary instant messaging interface, illustrating display for informing a user that unviewed messages are available, similar to the interface from FIG. 4. More specifically, the instant messaging window 482 includes a text window 484 and a contacts window 486. Also included is an unviewed instant messages window 1082, which can inform the user that because of a previous closure of the instant messaging software 399, the instant messaging software 399 has stored at least one unviewed message. As illustrated in the unviewed instant messages window 1082, the user can also be provided with the ability to view the at least one message or to close the unviewed instant messages window 1082 and delete the received messages.

Although not illustrated in the nonlimiting example of FIG. 10, other options may also be provided to the user. More specifically, the user may be provided with the identity of the sender of the unviewed message as well as other information that may help the user determine whether to view the unviewed message. Alternatively, upon activating the instant messaging software 399, the unviewed messages may simply be displayed.

Figure 11:
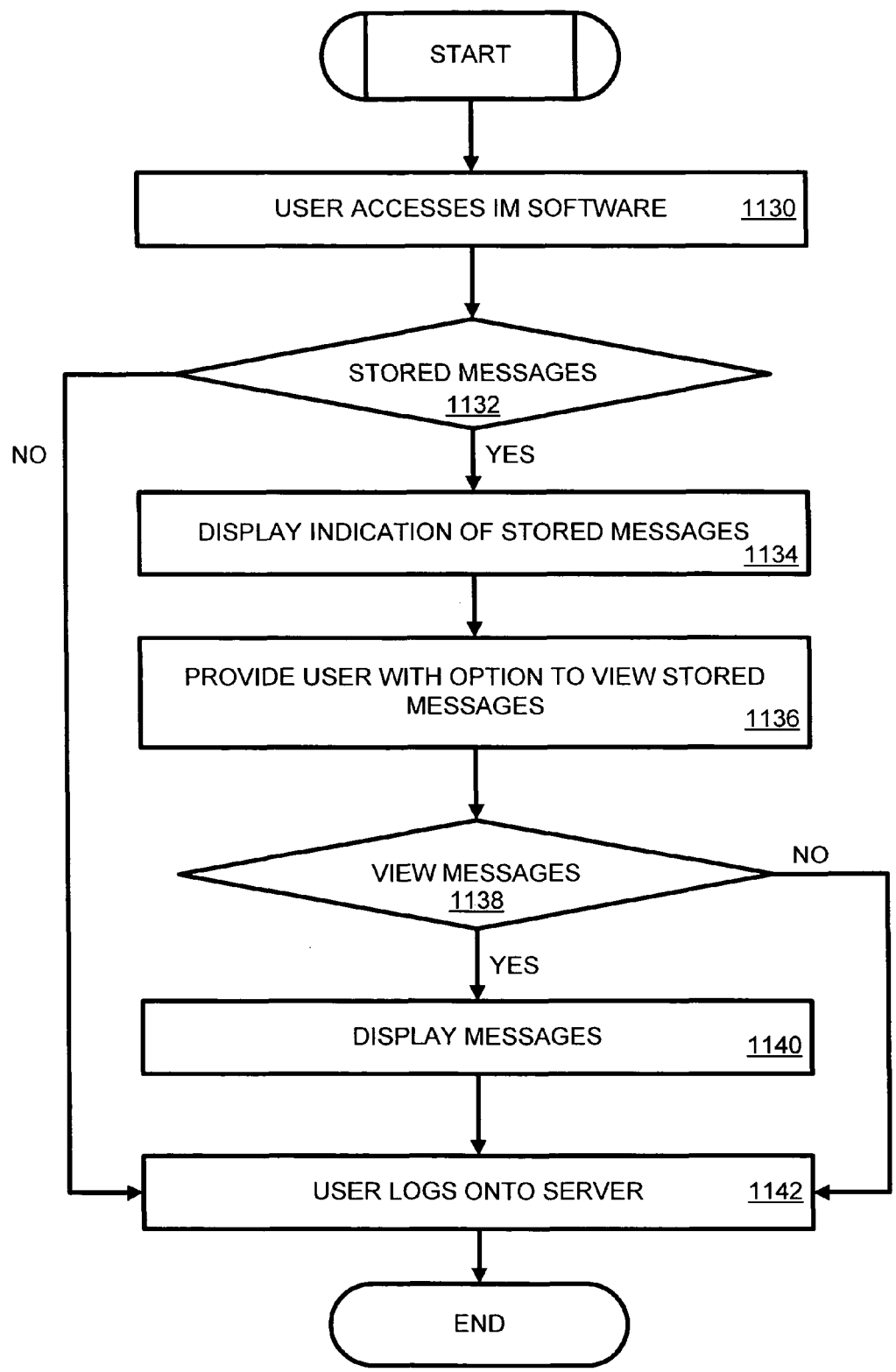
FIG. 11 is a flowchart of exemplary steps for client software 399 to determine if a received message is viewed by a user in an instant messaging environment such as the environments from FIGS. 1 and 2.

FIG. 11 is a flowchart of exemplary steps for client software 399 to determine if a received message is viewed by a user in an instant messaging environment such as the environments from FIGS. 1 and 2. As illustrated, in the flowchart of FIG. 11, the user accesses the instant messaging software 399 (block 1130), as described above. Once the user accesses the instant messaging software 399, the instant messaging software 399 can determine whether there are any stored messages (block 1132). As described above, due to an expected or unexpected termination of the instant messaging software 399, there may have been received but unviewed messages.

If there are stored messages, the instant messaging software 399 can display an indication of the stored messages (block 1134). The indication may take the form of a window, such as unviewed instant messages window 1082, however this is not a requirement. The instant messaging software 399 can then provide the user with an option to view the stored messages (block 1136) and determine whether the user wishes to view the messages (block 1138). If the user chooses view the messages, the instant messaging software 399 can display the unviewed messages (block 1140). The instant messaging software 399 can then log the user onto the instant messaging server 102 (block 1142), as described above.

If, at block 1132, the instant messaging software 399 determines that there are no stored messages, the instant messaging software 399 can simply proceed to logging the user onto the instant messaging server 102 (block 1142). Similarly, if the user, at block 1138, decides not to view the messages, the instant messaging software 399 can simply log the user onto the instant messaging server 102 (block 1142).

One should note that although the embodiments discussed above describe saving messages based on presence, whether a message is viewed, and whether a shutdown or restart is intentional, these are nonlimiting examples. Other determinations can be made to insure that a user does not lose a received but un-viewed message. Similarly, while the examples discussed above indicate various determinations being utilized separately, any permutation of determinations can be used to achieve the desired results.

Additionally, one should note that while an indication of unviewed messages may be provided via the instant messaging software 399 that received the message, this is also a nonlimiting example. More specifically, in at least one embodiment, the instant messaging software 399 can be configured to forward unviewed messages to a second user device that is configured for receiving the forwarded message. Similarly, the instant messaging software 399 can be configured to convert the unviewed message to a format that is understandable by the second device. Nonlimiting examples include forwarding the unviewed message(s) to a second device via the instant messaging protocol of the received message, forwarding the message(s) via a second instant messaging protocol, forwarding via email, forwarding via a text-to-voice conversion to a telephone, VoIP device, etc. Other forwarding techniques may also be implemented.

One should also note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Additionally, other embodiments can include forwarding the received (but un-viewed) message to another client device related to the user. As a nonlimiting example, upon determining that the user has not viewed a received message, the instant messaging server (or client software 399) can determine a user device that the user may be presently using, and forward the message to that location. The depending on the device where the message is forwarded, a conversion of message format can be included in the forwarding process. More specifically, if it is determined that the user is currently logged onto a cellular telephone network, the message can be forwarded to the user's telephone as a voice message, as an email, as an email with the instant messages included as attachments, as a SMS text message, or any combination of formats.

One should also note that any of the programs listed herein, which can include an ordered listing of executable instructions for implementing logical functions, can be embodied in any computer readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

The invention claimed is:

1. A method for saving instant messages, comprising:
receiving, at a client computing device of a recipient that executes an instant messaging application, an instant message from a sender via an instant messaging server, wherein the instant message is configured for delivery to the recipient;
storing the instant message for subsequent viewing by the recipient at the client computing device of the recipient;
receiving an indication that the instant messaging application is shutting down;
in response to receiving the indication that the instant messaging application is shutting down, determining whether shutting down is intentional;
in response to determining that shutting down is intentional, deleting the stored instant message from the client computing device of the recipient;
determining whether the recipient has viewed the instant message;
in response to determining that the recipient has viewed the instant message, deleting the instant message from the client computing device of the recipient;
shutting down the instant messaging application;
restarting the instant messaging application;
determining whether the instant messaging application includes at least one stored instant message;
in response to determining that the instant messaging application includes at least one stored instant message from an unintentional shutdown of the instant messaging application, providing an indication of the stored instant message and providing the recipient with an option to view the stored instant message, where the indication includes an identification of the sender that sent the instant message, the identification being presented prior to display of the stored instant message; and
in response to receiving an indication to provide the recipient with the stored message, providing the stored message to the recipient.

2. The method of claim 1, wherein determining whether the recipient has viewed an instant message includes at least one of the following: determining whether instant messaging software is inactive, determining presence status of the recipient with the instant messaging server, determining presence status of the recipient with the client computing device, and determining whether the disconnection occurred as a result of user input.

3. The method of claim 1, further comprising authenticating the recipient with an authentication server.

4. The method of claim 1, further comprising, in response to determining that the instant message has not been viewed, forwarding the instant message to a second client device related to the recipient.

5. The method of claim 4, further comprising translating the instant message into a format that is understandable by the second client device related to the recipient.

6. The method of claim 1, wherein determining whether the instant messaging application is inactive includes determining whether the instant messaging application is being displayed to the user as a primary application on a user interface.

7. A non-transitory computer readable medium having a program for saving instant messages, the program configured to cause a computer to perform at least the following:
   receive, at a client computing device of a recipient that executes an instant messaging application, an instant message from a sender via an instant messaging server, wherein the instant message is configured for delivery to the recipient;
   store the instant message for subsequent viewing by the recipient at the client computing device of the recipient;
   receive an indication that the instant messaging application is shutting down;
   in response to receiving the indication that the instant messaging application is shutting down, determine whether shutting down is intentional;
   in response to determining that shutting down is intentional, delete the stored instant message from the client computing device of the recipient;
   determine whether the recipient has viewed the instant message; and
   in response to determining that the recipient has viewed the instant message, delete the instant message from the client computing device of the recipient; and
   in response to determining that the recipient has not viewed the instant message, after unintentionally shutting down of the instant message application, and after restarting the instant messaging application, providing an indication that the instant message has not been viewed, where the indication includes an identification of the sender of the instant message, the identification of the sender being provided before display of the instant message.

8. The non-transitory computer readable medium of claim 7, the program further comprising logic configured to provide at least one previously stored instant message to the recipient.

9. The non-transitory computer readable medium of claim 7, wherein determining whether the recipient has viewed an instant message includes at least one of the following: determining whether instant messaging software is inactive, determining presence status of the recipient with the instant messaging server, determining presence status of the recipient with the client computing device, and determining whether the disconnection occurred as a result of user input.

10. The non-transitory computer readable medium of claim 7, the program further comprising logic configured to authenticate the recipient with an authentication server.

11. The non-transitory computer readable medium of claim 7, the program further comprising, logic configured to, in response to determining that the instant message has not been viewed, forward the instant message to a second client device related to the recipient.

12. A client user device configured for facilitating the communication of instant messages, the client device comprising:
   a processor; and
   a memory storing an instant messaging application configured to cause the client user device to perform the following:
      receive an instant message from a sender via an instant messaging server, wherein the instant message is configured for delivery to a recipient;
      store the instant message for subsequent viewing by the recipient at the client user device of the recipient;
      receive an indication that the instant messaging application is shutting down;
      in response to receiving the indication that the instant messaging application is shutting down, determine whether shutting down is intentional;
      in response to determining that shutting down is intentional, delete the stored instant message from the client user device of the recipient;
      determine whether the recipient has viewed the instant message; and
      in response to determining that the recipient has viewed the instant message, delete the instant message from the client user device of the recipient; and
      in response to determining that the recipient has not viewed the instant message, after unintentionally shutting down of the instant messaging application, and after restarting the instant messaging application, providing an indication that the instant message has not been viewed, where the indication includes an identification of the sender of the instant message, the identification of the sender being provided before display of the instant message.

13. The client user device of claim 12, the application further comprising logic configured to provide at least one previously stored instant message to the recipient.

14. The client user device of claim 12, wherein determining whether the recipient has viewed an instant message includes at least one of the following: determining whether instant messaging software is inactive, determining presence status of the recipient with the instant messaging server, determining presence status of the recipient with the client user device, and determining whether the disconnection occurred as a result of user input.

15. The client user device of claim 12, the application further comprising, logic configured to, in response to determining that the instant message has not been viewed, forward the instant message to a second client device related to the recipient.

16. The client user device of claim 15, the application further comprising logic configured to translate the instant message into a format that is understandable by the second client device related to the recipient.

* * * * *